March 12, 1929. W. B. BURKE 1,705,083
VULCANIZING AIR BAGS
Filed Jan. 5, 1927
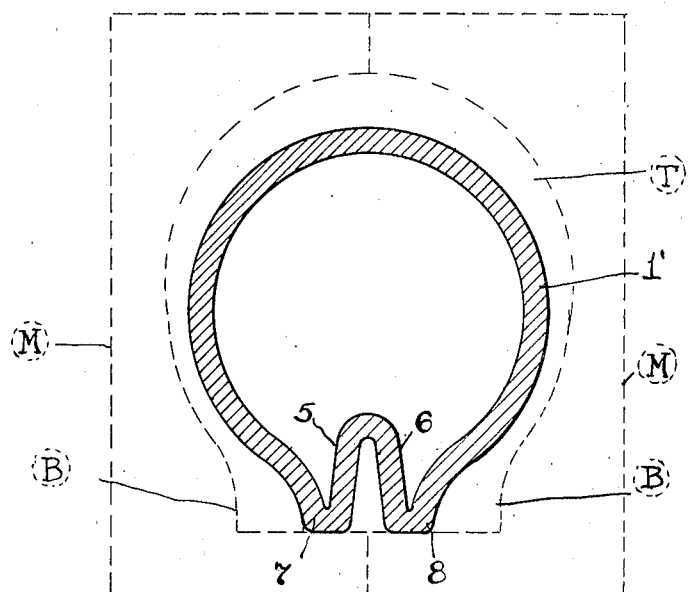
Fig. 3
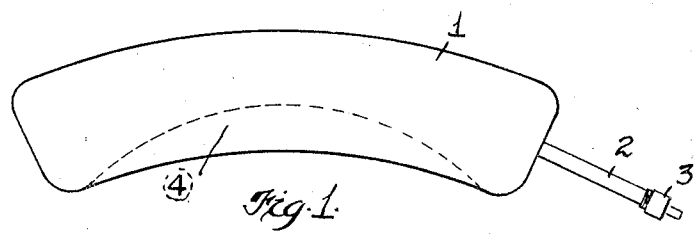
Fig. 1
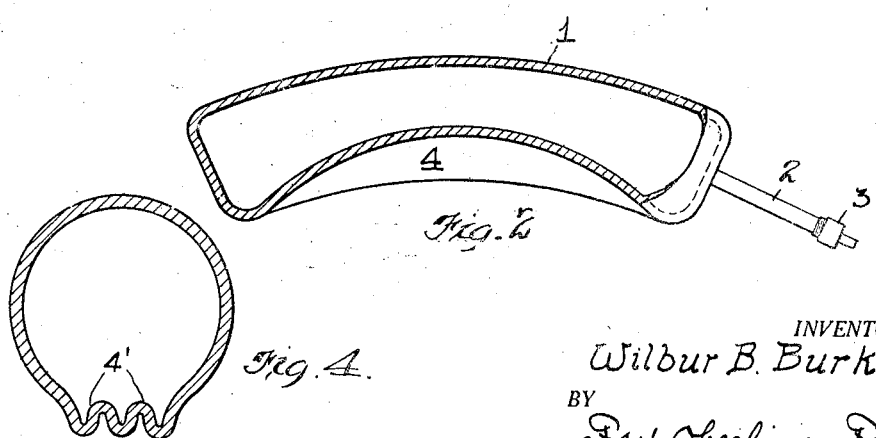
Fig. 2
Fig. 4
INVENTOR.
Wilbur B. Burke
BY
Fay, Oberlin & Fay
ATTORNEYS.

Patented Mar. 12, 1929.

1,705,083

UNITED STATES PATENT OFFICE.

WILBUR B. BURKE, OF EAST CLEVELAND, OHIO.

VULCANIZING AIR BAGS.

Application filed January 5, 1927. Serial No. 159,086.

This invention relates to vulcanizing apparatus, and more particularly cores or airbags for use inside of a tire shoe. For vulcanizing repairs on tire shoes, it has generally been customary to employ an inflatable air-bag placed inside of the tire shoe in the mold-segment. Heretofore such bags largely have been made of square-woven fabric cut on the bias. Others have been made of cord fabric. The amount of expansion possible has been quite limited at best; and folds have been prone to occur accidentally at the crown portions. A core which will be free from a tendency to accidental folds, and which will also provide effective molding pressure at the beads of a tire is accordingly highly desirable in the art.

To the accomplishment of the foregoing and related ends, the invention, then, consists of the features hereinafter fully described, and particularly pointed out in the claims, the following description and the annexed drawing setting forth illustrative instances of the various forms in which the principle of the invention may be applied.

In said annexed drawing:

Fig. 1 is a side elevational view of a core in accordance with the invention; Fig. 2 is a central longitudinal section of the same; Fig. 3 is a transverse section of the typical core construction, and showing also how a core embodying the features of this invention may be used with full molds; and Fig. 4 is a transverse section of a further form of the invention.

For the usual repair job, the core will ordinarily be of short arcuate form, as illustrated in Fig. 1, and provided with an inflating connection 2 having a valve 3. The bag 1 may be made up of material having more or less stretchability, if desired, but preferably the walls are substantially non-stretchable, and formed of suitable material capable of sustaining the pressure, for instance multi-layered heavy rubberized fabric. To provide expansibility, a redundant fold, or a plurality of folds, is included in the wall, at a desired location; preferably this will be at the inner periphery, since it here at the same time affords a sort of toggle pressure on expansion, such as to particularly effect the bead portions of a tire being treated.

The fold, as applied in an arcuate core is tapered off at each end, as indicated by the dotted outline in Fig. 1, the fold thus being most effective centrally when expanded and presenting thence a graduatedly decreasing pressure toward each end.

In use, the arcuate core 1 is placed inside a tire shoe to be repaired, the assemblage being suitably located in a segmental mold of the repair type. The bag is inflated and the proper amount of heat applied for the time required for the cure, as usual. It will be noticed however, that the expansible fold 4 determines a graduated pressure application, greatest centrally at the repair portion to be vulcanized, and thence graduating off toward each end. In this manner, a most effective union of new and old rubber is obtained.

The same principle of construction is also applicable in a complete circular core, and in such instance, as shown in Fig. 3, the core 1' and tire shoe T are fully enclosed within the molds M. On the core being inflated, the fold-portions 5, 6, toggle out and crowd the marginal portions 7, 8, against the beads B of the tire. In this manner, the desirable action upon the bead portions undergoing vulcanizing may be had, and at the same time the detrimental effect of metal in contact with the fabric inner portions of the tire is avoided. The marginal portions 7 and 8 of the core fold may be made somewhat thicker and heavier than the remainder of the core, where preferred.

Instead of one fold a plurality or group of folds 4' may be employed (Fig. 4); the latter is usually preferable, and such construction may be embodied in arcuate bags of any extent or in complete circular cores.

In some cases sufficient inflation may be had by the expansion under heat, of an already air-filled core. Ordinarily though pressure to the extent required is applied at the time of vulcanization, a connecting tube being provided at the end of an arcuate core, or at the inner periphery of a circle core; and in some instances instead of air, steam may be used as the inflating fluid.

Other modes of applying the principle of the invention may be employed, change being made as regards the details disclosed, provided the means stated in any of the following claims, or the equivalent of such be employed.

I therefore particularly point out and distinctly claim as my invention:—

1. An arcuate core-bag having a longitudinal expansion-fold tapering off at its ends.

2. An arcuate core-bag having a plurality of longitudinal expansion-folds tapering off at each end.

3. An arcuate core-bag having at its inner periphery a plurality of longitudinal expansion-folds tapering off at each end.

4. An arcuate core-bag of non-stretchable rubberized textile having an inturned longitudinal expansion-fold at its inner periphery, said fold tapering off at its ends, and a valve-controlled connection at one end, for inflating.

Signed by me this 3 day of January, 1927.

WILBUR B. BURKE.